United States Patent [19]
Finkelstein et al.

[11] Patent Number: 5,856,661
[45] Date of Patent: Jan. 5, 1999

[54] CREDIT CARD WITH MAGNIFYING LENS FORMED WITH A RADIATION-CURABLE RESIN

[75] Inventors: Alan Finkelstein, Beverly Hills, Calif.; Ron Gschwandtner, Mt. Airy, Md.

[73] Assignee: Universal Magnifier LLC, Los Angeles, Calif.

[21] Appl. No.: 758,640

[22] Filed: Nov. 27, 1996

Related U.S. Application Data

[63] Continuation-in-part of Ser. No. 582,601, Jan. 3, 1996, Pat. No. 5,608,203, which is a continuation of Ser. No. 250,801, May 27, 1994, abandoned, which is a continuation-in-part of Ser. No. 197,218, Feb. 16, 1994, Pat. No. 5,434,405, which is a continuation-in-part of Ser. No. 834,490, Feb. 12, 1993, Pat. No. 5,412,199.

[51] Int. Cl.⁶ ................................................. G06K 19/00
[52] U.S. Cl. ........................... 235/487; 283/109; 283/904; 359/802; 359/806; 359/809; 264/1.38; 264/1.7
[58] Field of Search ..................................... 235/487, 493, 235/488, 489; 283/109, 904; 359/802, 806, 809; 264/1.38, 1.7, 1.9, 2.7, 162

[56] References Cited

U.S. PATENT DOCUMENTS

| | | | |
|---|---|---|---|
| 373,597 | 11/1887 | McMicken | 359/809 X |
| 2,234,942 | 7/1941 | Nichols | 359/809 |
| 2,631,368 | 10/1953 | Baukus | 359/809 X |
| 2,826,959 | 2/1958 | Schneider | 359/809 X |
| 3,108,853 | 10/1963 | Short et al. | 264/162 |
| 3,117,608 | 1/1964 | Goss et al. | 150/35 |
| 3,140,883 | 7/1964 | Anthony | 281/34 |
| 3,209,648 | 10/1965 | Chapman | 359/809 X |
| 3,408,347 | 10/1968 | Vogel | 359/808 |
| 3,437,548 | 4/1969 | Ayers | 264/162 X |
| 3,571,957 | 3/1971 | Cumming et al. | 40/2.2 |
| 4,044,889 | 8/1977 | Orentreich et al. | 206/459 |
| 4,067,947 | 1/1978 | Miori | 264/162 X |
| 4,076,384 | 2/1978 | Deml et al. | 264/1.38 |
| 4,137,863 | 2/1979 | Anglin | 359/811 |
| 4,294,782 | 10/1981 | Froehlig | 264/1.38 |
| 4,393,610 | 7/1983 | Adrian | 40/625 |
| 4,435,912 | 3/1984 | Adrian et al. | 40/365 |
| 4,502,236 | 3/1985 | Adrian | 40/365 |
| 4,805,680 | 2/1989 | Ueno | 359/809 |
| 4,863,026 | 9/1989 | Perkowski | 206/387 |
| 4,881,334 | 11/1989 | Brown | 40/365 |
| 5,124,089 | 6/1992 | Ohkoshi et al. | 26/1.38 |
| 5,151,582 | 9/1992 | Fujioka | 235/469 |
| 5,198,168 | 3/1993 | Thurston | 264/162 X |
| 5,215,334 | 6/1993 | Presson et al. | 283/16 |
| 5,534,101 | 7/1996 | Keyworth et al. | 264/1.38 X |
| 5,642,228 | 6/1997 | Takezawa et al. | 264/1.7 X |
| 5,681,871 | 10/1997 | Molock et al. | 264/1.38 X |

FOREIGN PATENT DOCUMENTS

| | | |
|---|---|---|
| H0805 D/31 | 12/1980 | European Pat. Off. . |
| 0 032 368 | 1/1981 | European Pat. Off. . |
| 323-108-A | 12/1987 | European Pat. Off. . |
| 6 92 00 552.7 | 4/1992 | Germany . |
| 361167506 | 7/1986 | Japan . |
| 1-171991 | 12/1987 | Japan . |
| 402006123 | 1/1990 | Japan . |
| 2-56680 | 4/1990 | Japan . |
| 2-93513 | 4/1990 | Japan . |
| 55-83015 | 6/1990 | Japan . |
| 4-101815 | 4/1992 | Japan . |

*Primary Examiner*—Anita Pellman Gross
*Assistant Examiner*—Michael G. Lee
*Attorney, Agent, or Firm*—Blakely, Sokoloff Taylor & Zafman LLP

[57] ABSTRACT

A financial transaction card for reading externally stored information includes a transparent, substantially non-foldable rigid base and a strip for carrying machine readable information. The rigid base comprises a magnifying lens. The lens is formed by machining a shallow cavity in the rigid base; partially filling the cavity with a radiation curable liquid resin; impressing a lens pattern on the surface of the resin with a die; and exposing the resin to radiation of sufficient intensity to cure the resin.

20 Claims, 6 Drawing Sheets

CREDIT CARD WITH MAGNIFYING LENS FORMED WITH A RADIATION-CURABLE RESIN

BACKGROUND OF THE INVENTION

1. Related Applications

This is a continuation-in-part of U.S. patent application Ser. No. 08/582,601 filed Jan. 3, 1996, now U.S. Pat. No. 5,608,203, which is a continuation of U.S. patent application Ser. No. 08/250,801 filed May 27, 1994, abandoned which is a continuation-in-part of U.S. patent application Ser. No. 08/197,218, filed Feb. 16, 1994, now U.S. Pat. No. 5,434,405 which in turn is a continuation-in-part of U.S. patent application Ser. No. 07/834,490, filed Feb. 12, 1993, now U.S. Pat. No. 5,412,199.

2. Field of the Invention

The present invention relates to pocket magnifiers and is specifically directed to a credit card having an integral magnifying lens.

3. Prior Art

There have long been reading lenses and magnifying glasses available to assist people in reading books, documents and the like without the use of reading glasses. These are particularly useful when the person encounters small print during an activity which makes it inconvenient or difficult to stop and put on reading glasses.

As an example, a book mark such as that shown in U.S. Pat. No. 3,140,883 issued to R. L. Anthony on Jul. 14, 1964 may be integrally attached to a book such as a telephone directory or a dictionary, wherein the end of the book mark is provided with a sealed pocket for receiving a plastic magnifying lens. The magnifying lens may be moved up and down the page as desired to provide magnification of the text in the book. This permits the user to read the text without first putting on his eyeglasses.

A pocket magnifier such as that shown in U.S. Pat. No. 3,409,347 issued to R. Vogel on Nov. 5, 1968 includes a pocket pouch adapted to be carried in the breast or hip pocket of the user or in a purse or wallet. The lens is formed of a transparent plastic sheet material having a substantial degree of stiffness and having fresnel lens contours molded into its upper surface. The lens unit may be slidably retracted into and extended out of the pocket. The pocket magnifier may be easily utilized to magnify small print and the like when the user is in a location where it is not feasible or desirable to stop an activity in order to put on reading glasses.

Other examples of special purposes magnifying lens structures are shown, by way of example, in U.S. Pat. No. 4,044,889 entitled "Cosmetic Container Including Integrated Lens Structure," issued to S. Orentreich et al. on Aug. 30, 1977, and U.S. Pat. No. 4,393,610 entitled "Card Carrying Microfilm and Associated Reading Lens and Process of Forming Same," issued to D. Adrian on Jul. 19, 1983.

With the ever expanding use of credit cards and other financial transaction cards, there is an increasing requirement that the card user be able to verify a transaction at the point-of-use. This means the user must be able to read the card invoice to determine the accuracy of the information before he signs the invoice to indicate his acceptance. Since most of the information on the invoice is impact printed either on a carbon set or carbonless form, the print is not only controlled in size but is often of a low contrast with respect to the base form paper. This makes the form difficult to read, particularly for those who normally require reading glasses. Also, when the transaction card is used, it is often not convenient to take the time to put on reading glasses before reviewing the card invoice. While the pocket magnifiers of the prior art could be used for this purpose, use of such devices requires a separate activity which does not provide a great improvement over the use of reading glasses. As a result, many credit card users simply do not take the time and effort to accurately verify a transaction at the point-of-sale, relying on the sales clerk for the accuracy of the information. A transaction card incorporating a magnifying lens has been proposed in Japanese Utility Model Application Kokai No. 2-56680 published Apr. 24, 1990. This reference, however does not disclose a method for efficiently manufacturing such a card.

Therefore, there remains a need for a practical, cost-efficient method of manufacturing a financial transaction card with an integral magnifying lens.

SUMMARY OF THE INVENTION

It is, therefore, an object and feature of the subject invention to provide for a credit card having an integral magnifying lens permitting the user to immediately verify financial transactions at the point- of-sale without first requiring that the user put on reading glasses or the like.

It is another object and feature of the invention to enhance the use of credit cards by permitting immediate verification of credit card transactions by users normally having difficulty in reading small print, without requiring an additional activity of locating a magnifying lens or putting on reading glasses.

It is another object and feature of the subject invention to provide for a credit card having an integral magnifying lens and adapted for enlarging the small print generally used in the confined space of the credit card transaction form.

It is yet another object and feature of the invention to provide for an integral lens in a financial transaction card wherein the lens does not interfere with the machine readable information required on the card in order to complete a point-of-sale transaction.

The subject invention is directed to a financial transaction card such as a credit card or the like which incorporates an integral magnifying lens. Use of the card of the subject invention automatically places a magnifying lens at the disposal of the user, whereby he may immediately verify a financial transaction at the point-of-sale without first locating a magnifying glass or taking the time and effort to put on reading glasses. The invention is particularly useful when making credit card transactions during an activity where the user would not normally be wearing his reading glasses. For example, during sports activities or other types of activities where a person does not normally encounter reading material, it may be desirable to make a credit card transaction in order to pay for rental of equipment or user fees or the like. By using the credit card of the subject invention, the user can immediately read and verify the financial transaction at the point-of-sale by placing the magnifying lens incorporated in the credit card over the printed material on the transaction form. Thus, the print is magnified with the card used for the transaction, eliminating the need to locate a pocket magnifier or the time and effort required to put on reading glasses in order to verify the transaction.

In a preferred form of the invention, a typical credit card blank is subdivided into a plurality of zones, specifically a data zone and a non-data zone. The data zone is adapted for receiving and carrying machine readable information, preferably in the form of a strip such as a magnetic strip including magnetically encoded information, and embossed alpha numeric lettering for creating an imprint on the credit card transaction form. The non-data zone is generally free of any information required to be machine read, although this zone often includes identifying indicia, logo types and other information relating to the issuing institution. In one preferred form of the invention, a portion of the non-data zone includes an integral magnifying lens carried in and forming a part of the credit card. It has been found that a substantially rigid, transparent plastic material of a thickness corresponding to the thickness of the credit card base may be incorporated in a window provided in the base. In a preferred embodiment of the invention, the transparent plastic includes fresnel lens contours on the top surface for defining a magnifying lens. By placing the lens in the non-data zone, the lens does not interfere with the machine transactions required in order to use the credit card at a point-of-sale.

In a more specific embodiment of the invention, the lens is an elongated rectangle generally placed in parallel with the magnetic strip which is commonly attached to the back of the credit card. In this embodiment, there is no alteration of the data zone as commonly incorporated on credit cards.

A second embodiment of the invention incorporates a lens with a larger usable area. However, this particular embodiment requires alteration of the data zone. Depending on the issuing institution, one embodiment may be more desirable over the other, depending on the flexibility of the location and format of the data zones on the card.

In a typical credit card, the base is made of a substantially rigid plastic material which is laminated with a thin printed material on both the top surface and the bottom surface thereof, including identifying indicia, logo types and the like on the top, the magnetic strip, a signature strip and various terms and conditions on the bottom. In one embodiment of the invention, the lens may be placed in the credit card prior to the laminating process, whereby the laminate cover materials may be used to overlap the edge of the lens and help retain it in the credit card. The lens may be sonic welded, adhesively secured or otherwise mounted in a window in the credit case base, with or without utilizing the laminate material to assist in framing and mounting the lens in the credit card.

In another embodiment, the lens is integral with the credit card base. In this embodiment, the credit card base is formed from a transparent material, such as an amorphous plastic. The stamped credit card base can be overprinted, laminated with printed material, etc. Thereafter, fresnel lens contours are stamped on the top surface of the blank in a selected area to define the magnifying lens. A hologram may also be added after the lamination.

In a particularly preferred embodiment, the inventive card comprises a substantially non-foldable rigid base. The rigid base comprises a magnifying lens. The card further comprises a strip, such as a magnetic tape strip, for carrying machine readable information, and optionally other features such as a signature strip or hologram patch.

The rigid base can be a laminate formed from a plurality of layers, or can be a single layer. The magnifying lens may be formed by stamping fresnel contours directly onto the top surface of the top layer of the rigid laminate, or the top surface of the single layer. The fresnel contours are stamped into a transparent area of the laminate or single layer, and together with the transparent area form the magnifying lens.

There are also provided methods of producing a financial transaction card as described above. A particularly preferred method comprises the steps of providing a transparent, substantially non-foldable rigid base; forming a shallow cavity in the base; partially filling the cavity with a radiation curable liquid resin; impressing a lens pattern on the surface of the resin with a die; and exposing the resin to radiation of sufficient intensity to cure the resin.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like elements are numbered alike throughout the drawings.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
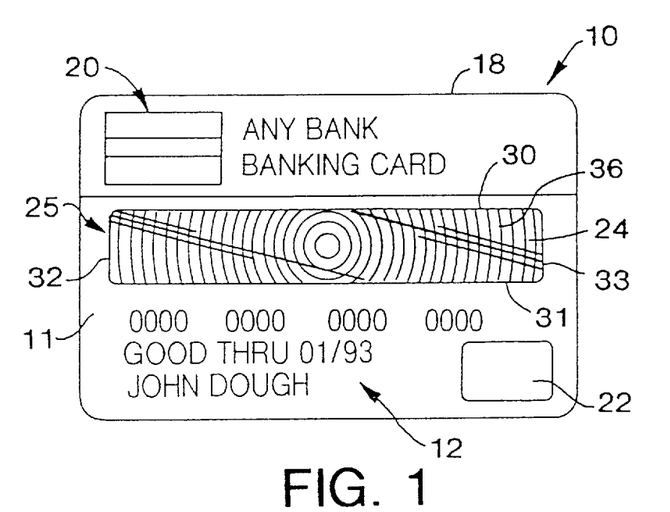
FIG. 1 shows the top side of a credit card incorporating a magnifying lens, in accordance with the subject invention.
Figure 2:
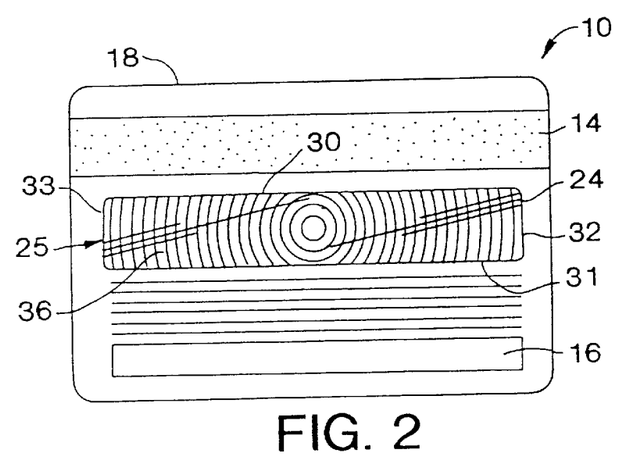
FIG. 2 shows the bottom side of the credit card of FIG. 1.

A typical financial transaction card such as the credit card 10 is shown in FIG. 1 and includes, as is common, embossed lettering at 12, which is machine readable for permitting the credit card to be imprinted at a point-of-sale transaction. As is shown in FIG. 2, most credit cards now contain a strip 14 for carrying machine readable information, for example a magnetic strip material which includes magnetically encoded information readable by computer terminals utilized in many point-of-sale terminals. Also included is a signature strip 16 which is on the back of the card and which typically is adapted for receiving a manually applied signature to be applied by the user of the card.

The magnetic strip 14 and embossed lettering 12, along with the signature strip 16, identify a data zone on the card. This data zone is generally controlled by financial institutions in an effort to standardize the cards so that various cards issued by a multiplicity of institutions may be used on standardized terminals the point-of-sale. For example, the placement of the magnetic strip 14 relative to the top edge 18 of the card is standardized, as is the width of the strip 14 in order to permit ready readability of the magnetically coded information by any typical point-of-sale magnetic reader. Likewise, the font, size and position of the embossed lettering 12 is controlled to assure machine readability of the information imprinted from the card when a point-of-sale transaction is made on a typical credit card imprinter. Only the position of the signature strip 16 can be altered without interfering with the machine readability of the card.

Today, many cards also include identifying indicia such as logo types and the like as indicated at 20 for identifying the issuing institution. An increasing number of cards also include a hologram patch 22 which includes issuing institution indicia. The hologram panel 22 is generally located in or near the portion of the data zone including the embossed lettering 12. In the embodiment of the invention shown in FIGS. 1 and 2, a magnifying lens 24 is positioned in a window 25 provided in the base 11 of the card 10 such that it is in noninterfering relationship with the magnetic strip and the embossed lettering 12. The magnifying lens 24 is an elongate, rectangular lens mounted parallel to the magnetic strip 14 in the space between the magnetic strip and the embossed lettering. This space is generally sufficient in size to accommodate the lens 24 since it is required that the embossed lettering 12 be spaced sufficiently from the magnetic strip 14 to assure that the embossing of the card does not in any way alter the functionality of the magnetic strip.

In one embodiment of the invention, the lens member 24 comprises a substantially rigid, transparent plastic element having approximately the same rigidity as the credit card base. As shown in FIGS. 1 and 2, the credit card base 11 includes a window 25 having a top edge 30, a bottom edge 31 and side edges 32 and 33. The lens element 24 is adapted to be placed in the window 25 and has outer edges common with the window edges 30–33. The lens may then be sonic welded or adhesively secured to the credit card base 11 in the manner well known to those who are skilled in the art. In the preferred embodiment of the invention, the lens 24 is of a thickness corresponding to the thickness of the credit card base 11, assuring that the presence of the lens in the credit card does not interfere in any manner with the machine readability of the information contained in the embossed lettering 12 or in the magnetic strip 14.

A fresnel-type contour lens has been found to be particularly useful for this type of application. The fresnel contour lines 36 or ribs are typically contained on the top side of the lens, or the front of the credit card as shown in FIG. 1. This permits the credit card to be held with the front side up in typical manner, when utilizing the magnifying lens.

Figure 3:
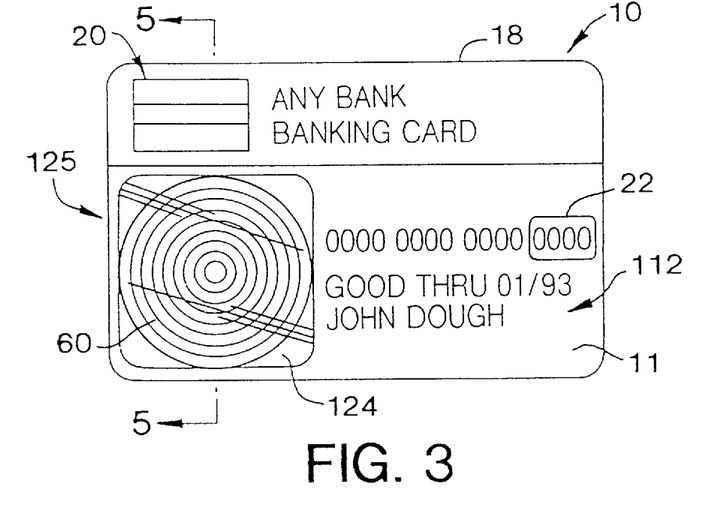
FIG. 3 shows the top side of an alternative embodiment of a credit card incorporated magnifying lens in accordance with the subject invention.
Figure 4:
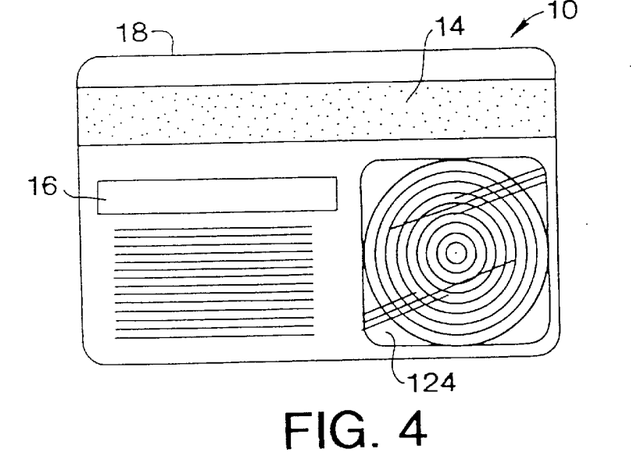
FIG. 4 shows the bottom side of the credit card of FIG. 3.

An alternative embodiment of the invention is shown in FIGS. 3 and 4. There, the lens element 124 is of a substantially square cross section utilizing a fresnel lens comprising the concentric circle configuration shown at 60, and mounted in a complementary window 125 in the base 11. This particular configuration of the invention is useful when it is possible to alter the shape of the data zone and the placement of the embossed lettering 112. As terminal encoders come more widely accepted, and the magnetic encoding strip 14 (FIG. 4) more commonly used as the source for machine readable information, the importance of the embossed lettering is becoming diminished. This will permit alteration of the placement of the embossed lettering on the card without interfering with the machine readability of the card at the point of sale. This permits the embossed lens element 124 to be customized to varying desires and taste without interfering with the overall machine readability of the credit card.

Figure 5:
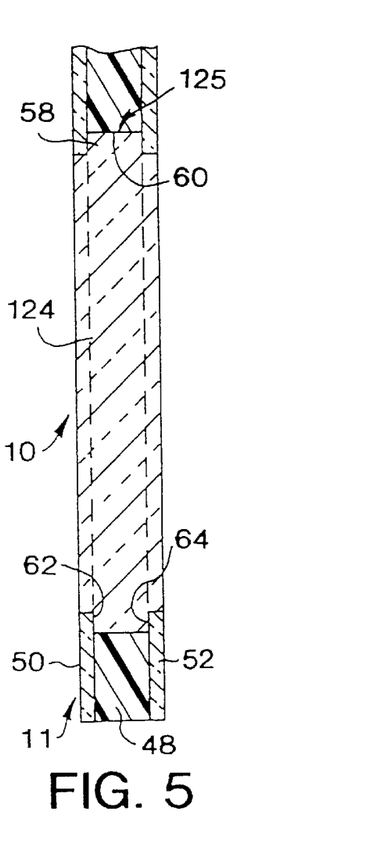
FIG. 5 is a cross sectional view of the credit card and lens combination, taking generally along the line 5—5 of FIG. 1.

As is shown in FIG. 5, the typical credit card base 11 is a laminated composite member including a solid core material as shown at 48 with a thin plastic laminate 50 on the top surface and a similar thin plastic material 52 laminated on the bottom surface. The term "thin" herein denotes that thicknesses of the plastic laminates 50 and 52 are small relative to the thickness of core 48. If desired, the core 48 and plastic laminates 50 and 52 can have any relative thicknesses. The laminates 50 and 52 are generally printed in a four-color format. permitting attractive logotypes identifying the financial institution and permitting customized color schemes for the card. The laminate materials 50 and 52 also carry the magnetic encoding strip 14, the signature strip 16 and the hologram panel 22. As shown in FIG. 5, the fresnel lens element 124 is located in the window 125 of the credit card and may be secured therein by sonic welding, adhesives or the like along the side edges of the window, as at 60. Where the laminated card is used, the laminate material 50 and 52 may overlap the edges 62, 64 of the window and the lens 124 may include a peripheral lip or rim 58 for holding the lens in place. of course, the lens may also be of a rectangular cross section and conically welded or adhesively secured to the base 48 with or without use of the laminates 50 and 52.

Figure 6:
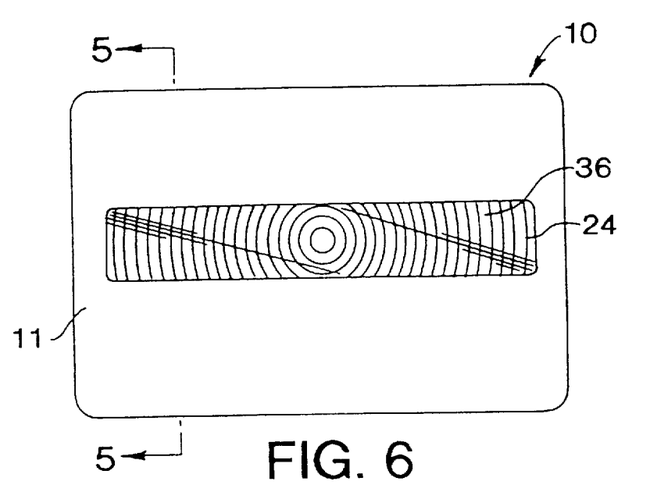
FIG. 6 shows the top side of a credit card blank having an integral magnifying lens.
Figure 7:
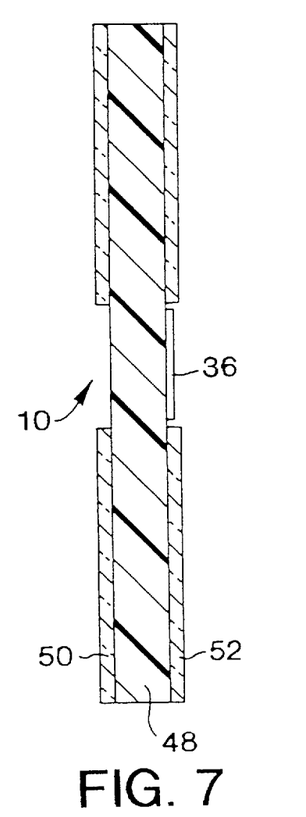
FIG. 7 is a cross sectional view of the credit card blank of FIG. 6 taken generally along the line 5—5 of FIG. 6.

It will be understood that the lens could be incorporated in the card a variety of ways, including being an integral, unitary member of the card base. Integral, unitary lenses can be formed in a number of ways, such as by molding or casting a transparent material into a window of a rigid base, or by stamping a transparent area of a rigid base. FIG. 6 illustrates one such alternative embodiment of the invention in which the lens is integral with the card base. Credit card base 48 comprises a substantially transparent plastic material. Preferably, the material is an amorphous plastic, such as polyvinyl chloride (PVC), polycarbonate, polyester or any other similar material. Lens 24 is formed in the credit card base 48 by, for example, stamping the desired fresnel contour lines 36 onto the top surface thereof. Embossed lettering (not shown) can be formed in the base simultaneously, or can be formed before or after the fresnel contour lines 36 are stamped onto the credit card base 48. Plastic laminates 50 and 52 can optionally also be applied to the top and bottom surfaces of the credit card base 48. The order in which the foregoing stamping, embossing and laminating steps are carried out is a matter of routine design choice. In a preferred embodiment, the fresnel contours 36 are stamped last, after all other embossing and laminating has been carried out.

Figure 8:
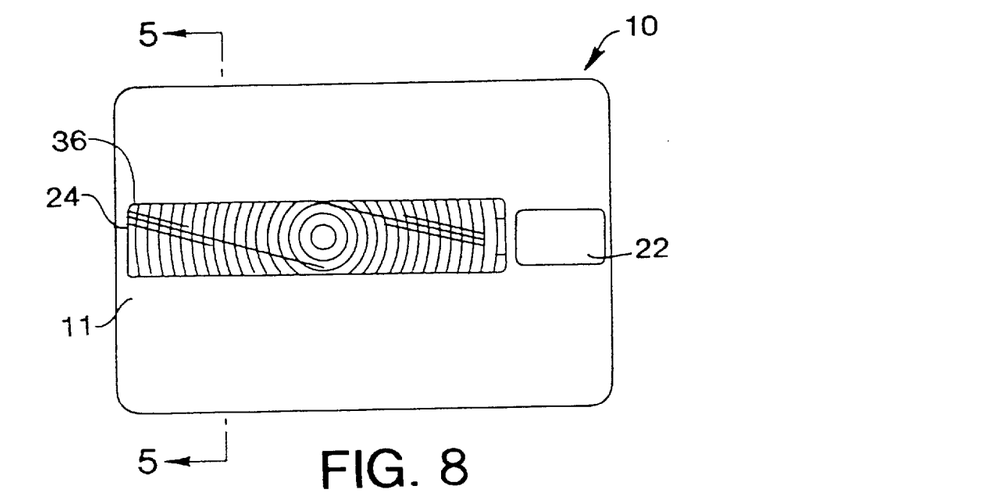
FIG. 8 shows the top side of a credit card having an integral horizontally extending magnifying lens and a hologram patch.

As with the preceding embodiments, magnetic strips, signature strips, hologram patches, etc. can also be added in the conventional manner. For example, in FIG. 8, an embodiment of a card 10 includes a lens 24 which horizontally extends partially across credit card base 11. Card 10 also includes hologram patch 22. If desired, plastic laminates 50 and 52 can be omitted, and strips, patches, etc. can be applied directly to base 48.

Figure 9:
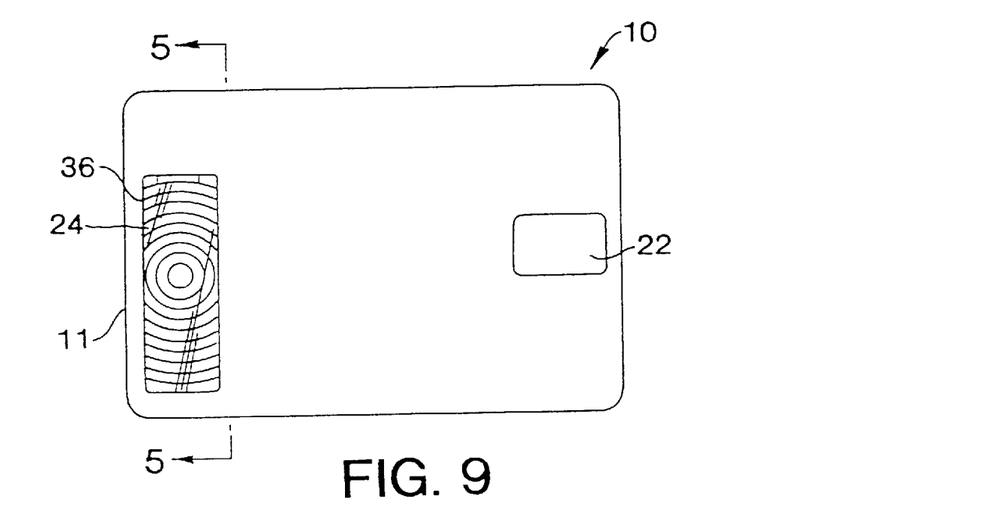
FIG. 9 shows the top side of a credit card having an integral vertically extending magnifying lens and a hologram patch.

Another embodiment, shown in FIG. 9, includes a vertically-oriented lens 24 stamped on one side of credit card base 11, with hologram patch 22 disposed near the opposite side of credit card base 11. Such an embodiment can, of course, also be produced by mounting a separate lens 24 in a credit card base 11 in a manner similar to the embodiment shown in FIG. 1.

Figure 10:
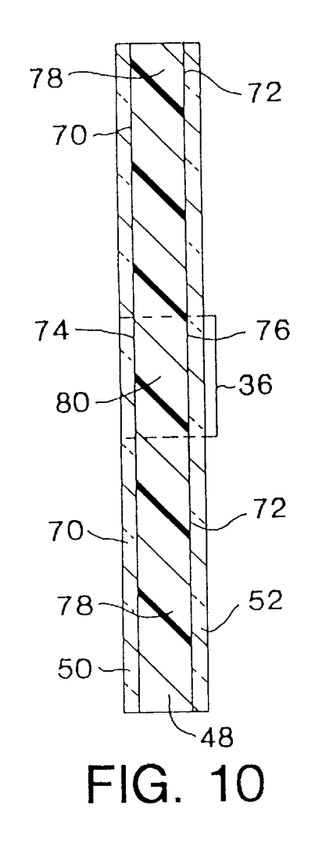
FIG. 10 is a cross-sectional view of a financial transaction card comprising three layers of material having aligned transparent areas, in which fresnel lines are formed in the top layer thereof to form an integral magnifying lens.

Still another embodiment is shown in FIG. 10. Credit card core 48 and bottom and top plastic laminates 50 and 52 comprise a substantially transparent plastic material, such as the amorphous plastics described above. Credit card core 48 can be comprised of a single layer, as shown, or can comprise multiple layers (a "split core"). Top and bottom plastic laminates 50 and 52 are laminated to core 48, forming top and bottom layers around a core layer. The structure thus forms a rigid and substantially non-foldable base. Lens 24 (not shown) is subsequently formed by stamping the desired fresnel contour lines 36 onto the top surface of top layer 52. Depending on the relative thicknesses of core 48 and top layer 52, fresnel contours 36 may be impressed into core 48 as well as top layer 52.

Preferably, core 48 and bottom and top plastic laminates 50 and 52 comprise the same substantially transparent plastic material. Bottom and top plastic laminates 50 and 52 preferably are colored over substantially all of their outer surfaces (areas 70 and 72), such as by printing, except for window areas 74 and 76. Core 48 can remain transparent, or can also be colored over substantially all of its lateral surfaces (areas 78 on either side of core 48), except for window area 80. The edges of core 48 can also optionally be colored. Window areas 74, 76 and 80 are located such that they are aligned when the laminate structure is formed. Together with fresnel contours 36, aligned window areas 74,76 and 80 thus form magnifying lens 24.

The transparent material forming core 48 and top and bottom plastic laminates 50 and 52 should be chosen to display refractive properties such that, together with appropriately designed fresnel contour lines 36, a magnifying lens 24 having the desired magnification is produced. Selection of suitable plastic materials, and design of appropriate fresnel contours, is a matter of routine design choice to those skilled in the art.

Card 10 can include embossed lettering (not shown), as described previously, in addition to a magnetic strip and optionally a signature strip. A hologram patch can also be included. other desired graphical features such as symbols, logos, pictorial representations, etc., can be provided if desired. The magnetic strip, signature strip and/or hologram patch can be on either side of the card 10. That is, these features can be disposed on the same side of the card as the fresnel contours 36 are stamped on, or on the opposite side, in any desired combination. Placement of the various strips and patches in any embodiment of the instant invention is a matter of routine design choice.

However, in the foregoing embodiment it is preferable that no lamination steps are carried out after fresnel contour lines 36 have been formed, or at the least no lamination steps over the entire surface of card 10 including fresnel contour lines 36. This is because such subsequent lamination steps may fill in or flatten the fresnel contour lines 36 and thus render magnifying lens 24 inoperative.

Fresnel contour lines 36 can be stamped into top plastic laminate 52 in any desired orientation, such as horizontally, vertically, etc., and can be of any desired shape, such as rectangular, square, triangular, circular, oval, elliptical, star-shaped, diamond-shaped, etc., similarly to the lenses 24 described previously.

Selection of a particular embodiment from those described herein can be made by the individual manufacturer taking into account factors such as manufacturing capability, ease of manufacture, cost, etc.

Figure 11:
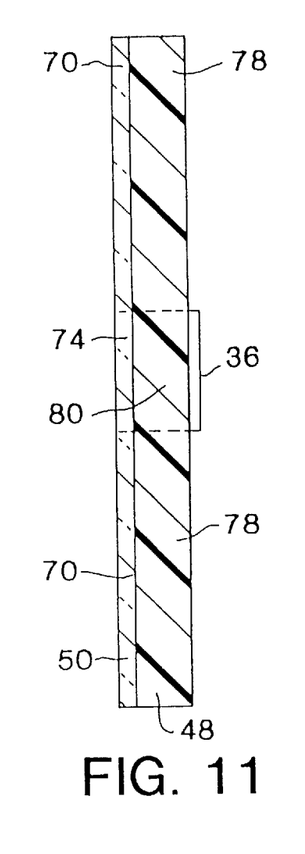
FIGS. 11 and 12 are cross-sectional views of financial transaction cards comprising two layers of a material having aligned transparent areas, in which fresnel lines are formed in the top layers thereof to form integral magnifying lenses.

Another embodiment is shown in FIG. 11. Here, credit card core 48 functions as a "top" layer, while bottom plastic laminate 50 comprises the "bottom-layer. Core 48 and bottom plastic laminate 50 again comprise a substantially transparent plastic material. Bottom plastic laminate 50 is laminated to core 48, forming top and bottom layers. The two layers together form a rigid, substantially non-foldable laminate structure. Lens 24 (not shown) is subsequently formed in core 48 by stamping the desired fresnel contour lines 36 onto the top surface thereof.

As with the preceding embodiment, core 48 and bottom plastic laminate 50 preferably comprise the same substantially transparent plastic material. Bottom plastic laminate 50 preferably is colored over substantially all of one or both of its sides (areas 70), such as by printing, except for window area 74. When both sides are so colored, core 48 can remain transparent, thus allowing printed information on the inner surface of bottom plastic laminate 50 (the side to which core 48 is laminated) to be read through the transparent plastic material. In the alternative, core 48 can also be colored over substantially all of the surface opposite the surface to which it is laminated with bottom layer 50 (areas 78 on the outer side of core 48), except for window area 80. Window areas 74 and 80 are located such that they are aligned when the laminate structure is formed. Together with fresnel contours 36, aligned window areas 74 and 80 form magnifying lens 24.

Figure 12:
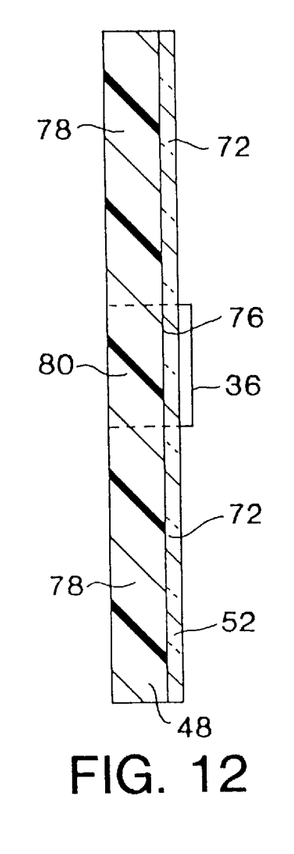

A variant of the foregoing preferred embodiment is shown in FIG. 12. Here, credit card core 48 functions as a "bottom" layer, while top plastic laminate 52 comprises the "top" layer. Core 48 and top plastic laminate 52 again comprise a substantially transparent plastic material. Top plastic laminate 52 is laminated to core 48, forming top and bottom layers. The two layers together form a rigid, substantially non-foldable laminate structure. Lens 24 (not shown) is subsequently formed in top payer 52 by stamping the desired fresnel contour lines 36 onto the top surface thereof.

Core 48 and top plastic laminate 52 preferably comprise the same substantially transparent plastic material. Top plastic laminate 52 preferably is colored over substantially all of one or both of its sides (areas 72), such as by printing, except for window area 76. When both sides are so colored, core 48 can remain transparent, thus allowing printed information on the inner surface of top plastic laminate 52 (the side to which core 48 is laminated) to be read through the transparent plastic material. In the alternative, core 48 can also be colored over substantially all of the surface opposite the surface to which it is laminated with top layer 52 (areas 78 on the outer side of core 48), except for window area 80. Window areas 76 and 80 are located such that they are aligned when the laminate structure is formed. Together with fresnel contours 36, aligned window areas 76 and 80 form magnifying lens 24.

Figure 13:
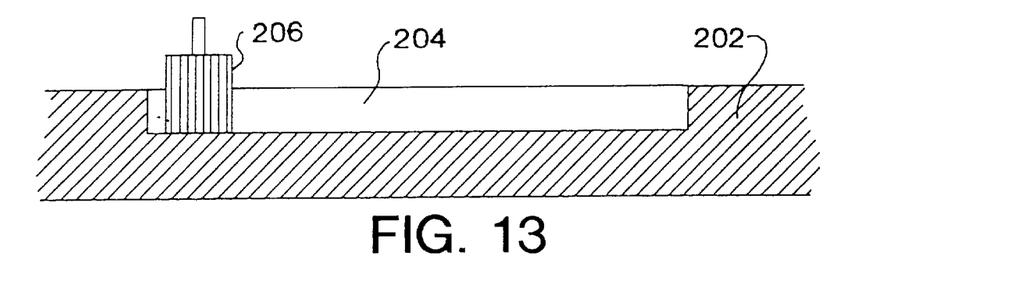
FIGS. 13–16 illustrate a preferred method of fabricating the magnifying lens of the present invention.

A particularly preferred embodiment of the invention is made by the process illustrated in FIGS. 13–16. Referring first to FIG. 13, a credit card blank or core 202 is provided.

The core material is transparent and is preferably polyvinyl chloride (PVC) although other suitable transparent materials may be used. A shallow cavity 204 is formed in the core material with a router 206 or other suitable means. The dimensions of cavity 204 correspond to the desired dimensions of the lens 24 (FIGS. 1, 2, 6, 8 and 9) or lens 124 (FIGS. 3,4). As already explained, cavity 204 should be located in a non-data region of the card. The depth of cavity 204 will depend on the particular material used to make the lens as described below, but is generally on the order of 0.008 inches. It is important to minimize any residual tool marks which will leave the floor of cavity 204 with a frosty appearance and thereby impair the clarity and sharpness of images viewed through the lens. If necessary, the floor of cavity 204 may be polished to remove residual tool marks.

Figure 14:
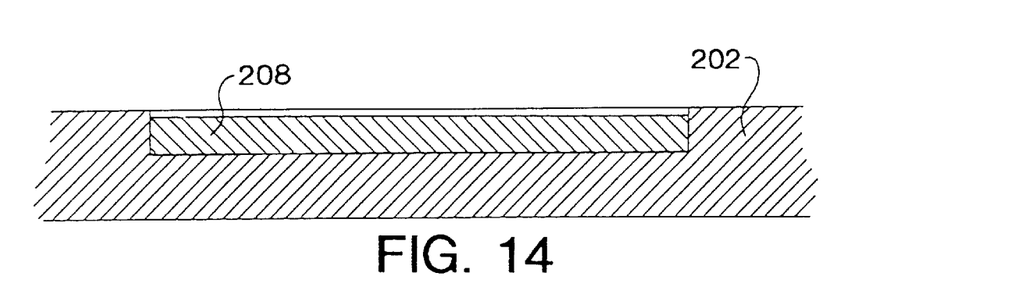

Referring now to FIG. 14, cavity 204 is partially filled with a liquid resin. The preferred class of resins for use with the method described herein comprises radiation-curable resins, with the curing of the resin being carried out by exposure to a suitable source of actinic radiation, such as ultraviolet light. A particular resin suitable for such use is a proprietary product of Decochem having the designation 7294 mod 7025. This particular material has been found to produce excellent replication of the lens die profile, good adhesion to the PVC card core and poor adhesion to the surface of the die. Other suitable radiation-curable resin systems or thermosetting resin systems may also be used.

Figure 15:
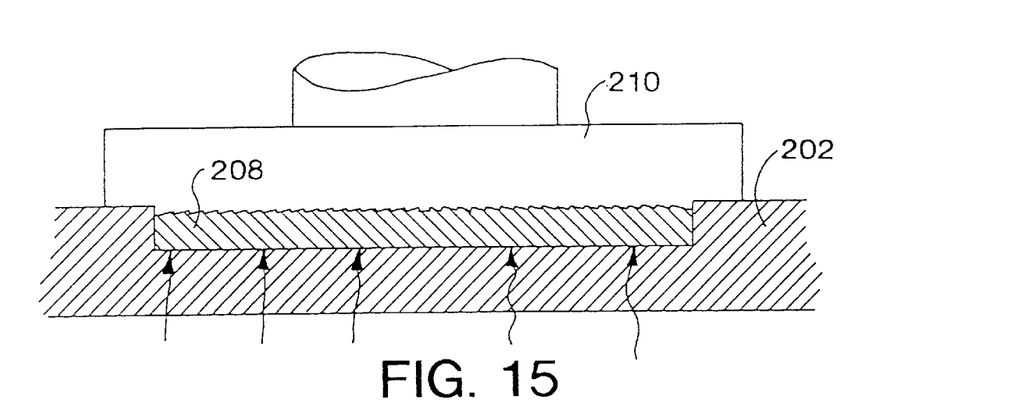

Referring to FIG. 15, once cavity 204 has been filled with a sufficient quantity of liquid resin, a die 210 is brought into contact with the surface of the resin. Die 210 is machined with a negative image of a fresnel lens pattern. The die is brought into contact with the surface of the liquid resin, taking care to prevent entrapment of air and expulsion of resin from the cavity. Once die 210 is properly positioned, resin 208 is exposed to ultraviolet radiation for a sufficient period of time to cure the resin. Using the preferred resin system, curing is accomplished in approximately 1–3 seconds.

Figure 16:
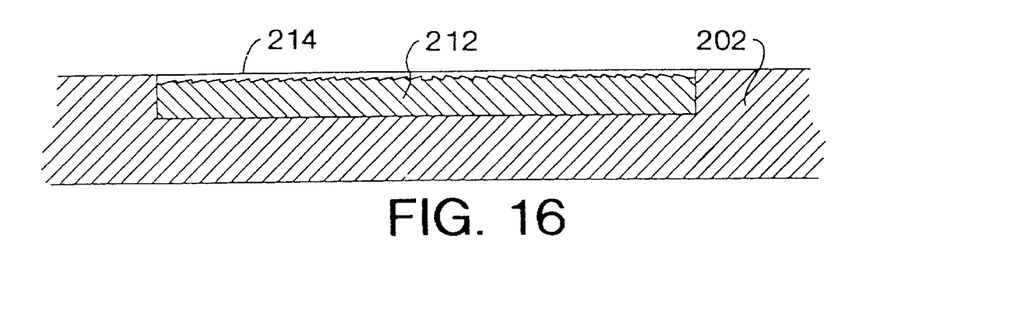

With reference to FIG. 16, the die 210 is removed after the resin has cured, leaving fresnel contours in the surface of the cured resin, thereby forming a lens 212. The lens contours are disposed below the upper surface of core 202, thereby helping to protect the lens from damage during routine handling.

After lens 212 is formed, card core 202 is further processed to produce a completed financial transaction card. Such further processing will typically include laminating top and bottom surface layers, embossing with financial account and cardholder identifying information, and application of a magnetic strip for storing such information in machine-readable form.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of making a financial transaction card having an integral magnifying lens comprising the steps of:

making a card blank from a substantially non-foldable rigid transparent plastic sheet material;

removing a portion of the sheet material to form a cavity in a first surface of the card blank;

filling the cavity with a radiation-curable liquid resin;

impressing a lens forming die into the liquid resin;

exposing the liquid resin to a sufficient level of actinic radiation to solidify the resin.

2. The method of claim 1 wherein the transparent plastic sheet material comprises polyvinyl chloride.

3. The method of claim 1 wherein the cavity is generally rectangular.

4. The method of claim 3 wherein the cavity is elongated in a direction parallel to a longer dimension of the financial transaction card.

5. The method of claim 4 wherein the cavity is located in a non-data region of the financial transaction card.

6. The method of claim 1 further comprising the step, after the step of removing a portion of the sheet material, of polishing a floor surface of the cavity.

7. The method of claim 1 wherein the step of removing a portion of the sheet material comprises mechanical routing of the card blank.

8. The method of claim 1 wherein the cavity has a depth of approximately 0.008 inches.

9. The method of claim 1 wherein the resin comprises an ultraviolet-curable resin.

10. The method of claim 1 wherein the lens forming die forms a plurality of Fresnel contours.

11. The method of claim 1 further comprising the step of embossing the card blank with financial account identifying data.

12. The method of claim 1 further comprising the step of applying a magnetic strip to the card blank.

13. The method of claim 12 wherein the magnetic strip is applied to a second surface of the card blank opposite the first surface.

14. A financial transaction card having an integral magnifying lens made by the process comprising the steps of:

making a card blank from a substantially non-foldable rigid transparent plastic sheet material;

removing a portion of the sheet material to form a cavity in a first surface of the card blank;

filling the cavity with a radiation-curable liquid resin;

impressing a lens forming die into the liquid resin;

exposing the liquid resin to a sufficient level of actinic radiation to solidify the resin.

15. The financial transaction card of claim 14 wherein the card blank comprises polyvinyl chloride.

16. The financial transaction card of claim 14 wherein the lens is generally rectangular.

17. The financial transaction card of claim 16 wherein the lens is elongated in a direction parallel to a longer dimension of the financial transaction card.

18. The financial transaction card of claim 17 wherein the lens is located in a non-data region of the financial transaction card.

19. The financial transaction card of claim 14 wherein a data region of the financial transaction card is embossed with financial account identifying data.

20. The financial transaction card of claim 14 further comprising a magnetic strip affixed to a data region thereof.

* * * * *

UNITED STATES PATENT AND TRADEMARK OFFICE
CERTIFICATE OF CORRECTION

PATENT NO. : 5,856,661
DATED : January 5, 1999
INVENTOR(S) : Finkelstein et al.

It is certified that error appears in the above-identified patent and that said Letters Patent is hereby corrected as shown below:

Title page,
Application No., Item [21], delete "758,640" and insert -- 08/758,640 --.

References Cited,
Item [56],
At patent number 5,124,089, delete "26/38" and insert -- 264/38 --.

Signed and Sealed this

Twentieth Day of November, 2001

Attest:

NICHOLAS P. GODICI
Attesting Officer   Acting Director of the United States Patent and Trademark Office